(12) United States Patent
Bauer

(10) Patent No.: US 8,051,903 B2
(45) Date of Patent: Nov. 8, 2011

(54) COOLING AND/OR HEATING DEVICE

(76) Inventor: Albert Bauer, Munich (DE)

(*) Notice: Subject to any disclaimer, the term of this patent is extended or adjusted under 35 U.S.C. 154(b) by 1101 days.

(21) Appl. No.: 10/599,590

(22) PCT Filed: Apr. 5, 2005

(86) PCT No.: PCT/EP2005/051516
§ 371 (c)(1),
(2), (4) Date: Jun. 13, 2007

(87) PCT Pub. No.: WO2005/098318
PCT Pub. Date: Oct. 20, 2005

(65) Prior Publication Data
US 2007/0295013 A1   Dec. 27, 2007

(30) Foreign Application Priority Data
Apr. 7, 2004 (DE) .......................... 10 2004 017 593

(51) Int. Cl.
F25B 29/00 (2006.01)
F24F 3/00 (2006.01)
(52) U.S. Cl. .......................... 165/201; 165/219; 165/260
(58) Field of Classification Search .................. 165/201, 165/205, 206, 207, 218, 219, 220, 260, 261, 165/262, 263, 264, 265
See application file for complete search history.

(56) References Cited

U.S. PATENT DOCUMENTS

| | | | |
|---|---|---|---|
| 2,357,706 A * | 9/1944 | Toepperwein | 165/265 |
| 4,084,388 A * | 4/1978 | Nelson | 165/206 |
| 4,729,424 A * | 3/1988 | Mizuno et al. | 165/261 |
| 6,499,535 B2 * | 12/2002 | Cowans | 165/264 |

FOREIGN PATENT DOCUMENTS

| | | |
|---|---|---|
| DE | 4203613 A1 | 8/1993 |
| DE | 4221725 A1 | 1/1994 |
| DE | 19912588 A1 | 9/2000 |

* cited by examiner

*Primary Examiner* — Ljiljana Ciric
(74) *Attorney, Agent, or Firm* — William J. Sapone; Coleman Sudol Sapone P.C.

(57) ABSTRACT

A cooling and/or heating device (10, 60) for use in the cooling and/or heating of one or more units (8a to 8c) includes a conduit network containing flow and return conduits (14, 16; 68, 70), with several circuits (12a to 12c; 32 to 38, 74 to 78) connected to the flow and return conduits (14, 16; 68, 70). Valves (28, 88, 96) are located in each circuit and used to regulate or control the volumetric flow through the circuits (12a to 12c; 32 to 38; 74 to 78). A heat transfer medium or coolant circulates through the conduit network, with at least one consuming device disposed in each circuit. Sensors (38) are provided in each circuit (12a-12c; 32-38; 74-78), the sensors (38) sending signals to a control unit and forming part of a control circuit. The control unit adjusts the valves (28, 88, 96) of each circuit as a function of the signals transmitted from the sensors (38) so as to hydraulically balance the individual circuits.

10 Claims, 3 Drawing Sheets

COOLING AND/OR HEATING DEVICE

BACKGROUND

The invention pertains to a cooling and/or heating device of the type described in the preamble of claim 1.

Such a cooling and/or heating device is known, for example, from EP 1 207 355 A2 and features a conduit network for at least one building with a main supply line. The main supply line is provided with a main flow conduit and a main return conduit. A fluid serves as the heat transfer medium or coolant in the conduit network. A heating circuit, a domestic water circuit and a ventilating circuit are connected to a distribution unit and feature heating/cooling sections with at least one valve each and at least one consuming device, e.g., a radiator/heat sink, a heat exchanger or the like. The distribution unit with the circuits connected thereto forms a supply unit. A valve arranged upstream or downstream of the supply unit is controlled as a function of the differential pressure between the supply conduit and return conduit. This differential pressure valve stabilizes the differential pressure between the supply conduit and return conduit of the supply unit such that the pressure in the supply unit can be maintained nearly constant and the supply units are uniformly supplied.

The individual circuits in the supply unit form so-called hydraulic circuits that can be either identical or configured differently.

EP 1 116 921 A2 also discloses a room air-conditioning system for buildings that comprises a device for heating and/or cooling a heat transfer medium and/or a coolant, several heat exchangers that release the heat of the medium into the surroundings and/or absorb the heat of the surroundings into the coolant, pipelines connecting the heat exchangers and the heating/cooling device to one another in order to transport the medium, and valves that are assigned to the heat exchangers and serve for adjusting the volumetric flow of the medium through the heat exchangers. A device for adjusting the medium pressure is also provided in order to vary the pressure of the medium. In addition, pressure sensors are assigned to the valves and actuators are provided for adjusting the valves. The device for adjusting the medium pressure makes it possible to obtain a central setpoint setting, for example, in order to centrally control a nighttime setback. Signals that switch the valves between nighttime setback and daytime settings are transmitted to pressure sensors in the form of predetermined pressure fluctuations. For this purpose, each pressure sensor features a sensor element that is moved as a function of the pressure of the medium, wherein said sensor element is mechanically, hydraulically, pneumatically or electrically coupled to the actuator of the valve and acts thereupon to adjust the valves. The valves are in this case provided in the form of thermostatic valves. This is intended to make it possible to switch the valve, for example, between nighttime setback and daytime settings independently of signal lines by means of the medium, such that the temperature setpoint is centrally adjusted.

Furthermore, DE 100 57 416 A1 discloses a central heating system for rooms to be heated in one or more buildings, wherein this system comprises a conduit network featuring flow and return conduits. Several heating sections are connected by means of supply and return conduits and are respectively provided with a valve for regulating/controlling the room temperature and at least one consuming device in the form of a radiator. In this case, each heating section features a flow restrictor that is arranged in the supply or return conduit of the heating section. This is intended to ensure a constant pressure level at the valves of each heating section.

The adjustment of a constant pressure level at the valves is referred to as hydraulic balancing. Hydraulic balancing makes it possible to ensure a sufficient water distribution in the conduit network under varying operating conditions without exceeding permissible noise levels. The utilization of section control valves, flow regulators, differential pressure regulators and a controlled circulating pump makes it possible to ensure an economical water distribution in the system by means of hydraulic balancing in accordance with the publication "IKZ-Haustechnik", Vol. 13, p. 48 ff., 1999. Due to these measures, the required energy is made available to all consuming devices, namely radiators, heat exchangers and the like, at all times in the form of a uniform volumetric flow at the same setting, for example, of the thermostatic valves. If no hydraulic balancing takes place, the following problems arise in addition to increased energy consumption: the rooms do not reach the desired temperature, system components are heated only with a certain time delay, the room temperature also fluctuates in the part load mode, and noise develops at the valves.

A radiator/heat sink can only perform its function if it receives the optimal volumetric flow of the heat transfer medium or coolant. An excessively low volumetric flow results in a reduced heating/cooling capacity. However, excessive quantities of fluid delivered to a radiator/heat sink do not result in a proportional increase of the heating capacity, but rather only in slightly higher heat emission.

It is known to pre-adjust valves, i.e., to define the through-opening of the valves in order to provide hydraulic balancing. In this case, the valves act as throttles such that the pressure level upstream of all valves is also identical in the full load mode when all the valves of all heating/cooling sections are completely open.

However, known solutions for realizing hydraulic balancing are costly because they require additional construction measures. Furthermore, the volumetric flow is also limited by the valves, section gates or flow restrictors in the part load mode, for example, when no hydraulic balancing is required.

SUMMARY OF THE INVENTION

Consequently, the invention is based on the objective of additionally developing a cooling and/or heating device of the type described in the preamble of claim 1 such that the aforementioned disadvantages are avoided by creating a simpler and more effective solution and improving the capacity of the cooling and/or heating device, particularly in the part load mode.

This objective is attained with the characteristics disclosed in the characterizing portion of claim 1, in connection with the characteristics of its preamble.

Advantageous additional developments of the invention form the objects of the dependent claims.

The invention is based on the notion of simply adjusting the valves, e.g., two-way valves or three-way valves, by means of a central control unit for regulating the heating and/or cooling demand of the units to be heated or to be cooled, if applicable, in connection with a temperature control circuit such that a slight modification of the software makes it possible to provide hydraulic balancing on demand with the valves that are already provided in the respective circuits.

According to the invention, the valves are connected to a control unit for adjusting the valve openings, wherein sensors are provided in the individual circuits and the sensors form part of a control circuit of the control unit that adjusts the valves as a function of the signals transmitted from the sensors to the control unit such that hydraulic balancing between the individual circuits is achieved. This construction provides the enormous advantage of eliminating the need for any additional hydraulic balancing measures, for example, section gates, flow restrictors and the like. Furthermore, the valves no longer act as throttles, particularly in the part load mode in which the demand for hydraulic balancing is comparatively low, so that the heating capacity of the consuming devices, i.e., of the radiators/heat sinks, heat exchangers or the like, is significantly increased.

Hydraulic balancing can be automatically controlled if sensors are provided in the individual circuits that cooperate with the control unit and together with this control unit determine whether or not hydraulic balancing is required. Corresponding control signals for the valves that either initiate hydraulic balancing or merely adjust the valve opening in accordance with the heating/cooling demand are then generated based on the information obtained from the sensors.

In this connection, the sensors can be arranged in the circuit in many different ways. For example, one respective sensor is provided upstream and downstream of the consumer.

The sensor can be realized in the form of a temperature sensor and/or pressure sensor. For example, if the temperature is used as the basis for determining whether or not hydraulic balancing is required, it is advantageous to arrange a sensor upstream and downstream of the radiator/heat sink, heat exchanger or the like.

In order to prevent the system from overshooting when hydraulic balancing is initiated, the valves are adjusted at certain time intervals and in predetermined increments with respect to the extent of the adjustment of the valve opening.

With the exception of the valve, no further flow restrictors are provided in the respective circuits of the conduit network in order to obtain the advantages of the invention in their entirety.

According to an embodiment of the invention, the valve cooperates with a servomotor that receives its control signals from the control unit and moves the actuator of the valve into the position defined by the control signal.

In this case the valve is in particular operated such that it does not act as a flow restrictor/throttle when it is completely open. Due to this measure, the volumetric flow that is generated by a pump in the conduit network and defined by the respective conduit cross section can be used for heating or cooling purposes without the valve generating a resistance. This significantly increases the capacity of the cooling and/or heating device in the part load mode. Measurements showed that it is possible to increase the capacity by approximately 30 percent.

The control unit preferably features a first control circuit for controlling the temperature and a second control circuit for controlling hydraulic balancing of the circuits.

In this case, the control unit is provided, in particular, with a minimum selector that is connected to the outputs of the control circuit such that the control signals for the valve or the valves resulting from both control circuits are fed to the control unit via the minimum selector, and the valve assumes the minimal setting if different control signals are received.

Other advantages, characteristics and possible applications of the present invention, namely a cooling and/or heating device, are disclosed in the following description in connection with the embodiments illustrated in the drawings.

BRIEF DESCRIPTION OF THE DRAWINGS

The invention is described in greater detail below with reference to the embodiments illustrated in the drawings. The terms and the respectively assigned reference symbols shown in the list of reference symbols are used in the description, the claims, the abstract and the drawings. In these drawings:

DETAILED DESCRIPTION OF THE INVENTION

Figure 1:
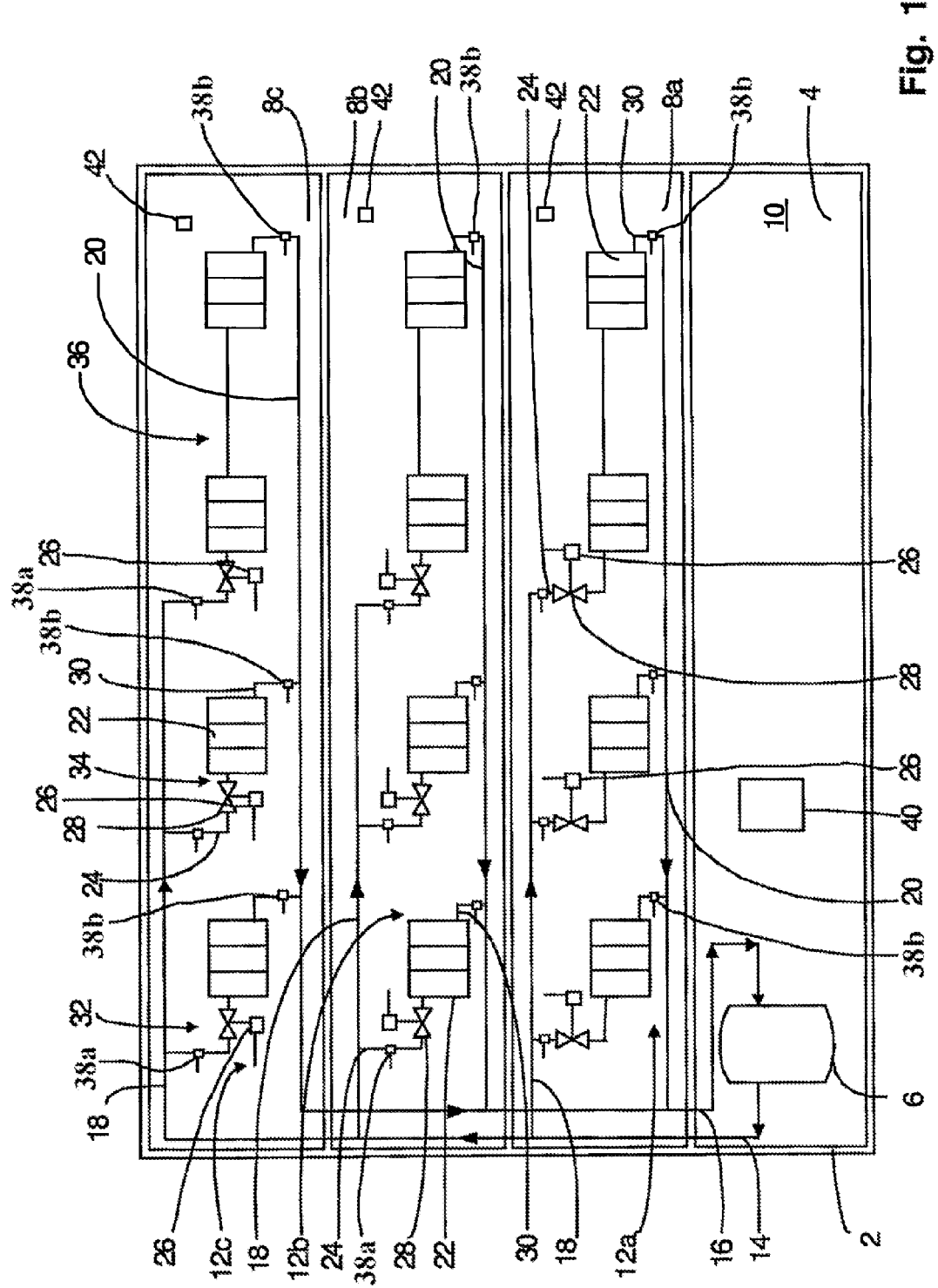
FIG. 1 shows a schematic circuit diagram of the heating device according to the invention in a building with several floors.

FIG. 1 shows a schematic building 2 that comprises a utility room 4 with a heat source 6 accommodated therein on the basement floor, and three heated floors 8a-8c, namely a first floor 8a, a second floor 8b and a third floor 8c. Three partial sections 12a-12c installed in the building 2 form part of a central heating system 10 and act as first heating circuits. The partial section 12a is installed on the first floor 8a, the partial section 12b is installed on the second floor 8b and the partial section 12c is installed on the third floor 8c.

The partial sections 12a-12c respectively include a flow conduit 18 and a return conduit 20 that extend separately from one another. The partial sections 12a-12c are connected to the heat source 6 by means of risers 14 and 16 that also have a flow conduit and a return conduit.

Three heating sections 32-36 that act as second heating circuits are connected to the respective partial sections 12a-12c on each heated floor 8a-8c. Each heating section 32-36 is connected to the flow conduit 18 of the assigned partial section 12a-12c with a supply conduit 24 and to the return conduit 20 of the assigned partial section 12a-12c with a return conduit 30. The first two heating sections 32 and 34 respectively feature only one consumer in the form of a radiator 22, while two radiators 22 are arranged in series in the third heating section 36 shown. The flow conduit 18 and the return conduit 20 of a partial section 12a-12c have the same conduit diameter.

A valve 28 arranged in the supply conduit 24 of each heating section 32-36 serves to regulate the room temperature and can be respectively actuated by means of an actuator 26.

One respective temperature sensor is arranged upstream 38a and downstream 38b of each radiator 22 if hydraulic balancing between the individual heating sections 32-36 needs to be achieved. Temperature sensors 38a, 38b are only provided for the series-connected radiators 22 in the partial section 12c, and in this case in the third heating section 36, upstream of the first radiator 22 and downstream of the last radiator 22 of this heating section 36. Naturally, only one temperature sensor 38 in the flow conduit and the return conduit of a partial section 12a-12c would also suffice to provide hydraulic balancing between the individual partial sections 12a-12c.

The temperature sensors 38a, 38b cooperate with a control unit 40 and deliver the corresponding flow and return temperatures of the heating sections 32-36 or 12a-12c, respectively.

The servomotors 26 are controlled by the control unit 40. The temperature sensors 38, the control unit 40 having a regulator 48, and the servomotors 26 with the valves 28 form part of a control circuit for hydraulically balancing the central heating system 10.

Other conventional sensors 42 are also provided and customarily form a control circuit for regulating the temperature in the rooms on the floors 8a-8c, together with the control unit 40 which has another regulator 46, the servomotors 26, and the valves 28.

For example, different flow speeds of the heat transfer medium normally occur in the central heating system 10 if the majority of valves 28 are open. An essentially constant flow speed is adjusted in the central heating system 10 due to the hydraulic balancing control circuit. Since the flow speeds are now essentially constant, pressure fluctuations are prevented within the conduit network of the central heating system 10, particularly in the supply conduits 24 and the return conduits 30 of each heating section 32 and therefore at the valves 28. Consequently, the hysteresis of the valves 28 relative to one another remains unchanged. This provides the advantage that the room temperature is controlled isochronously.

Figure 2:
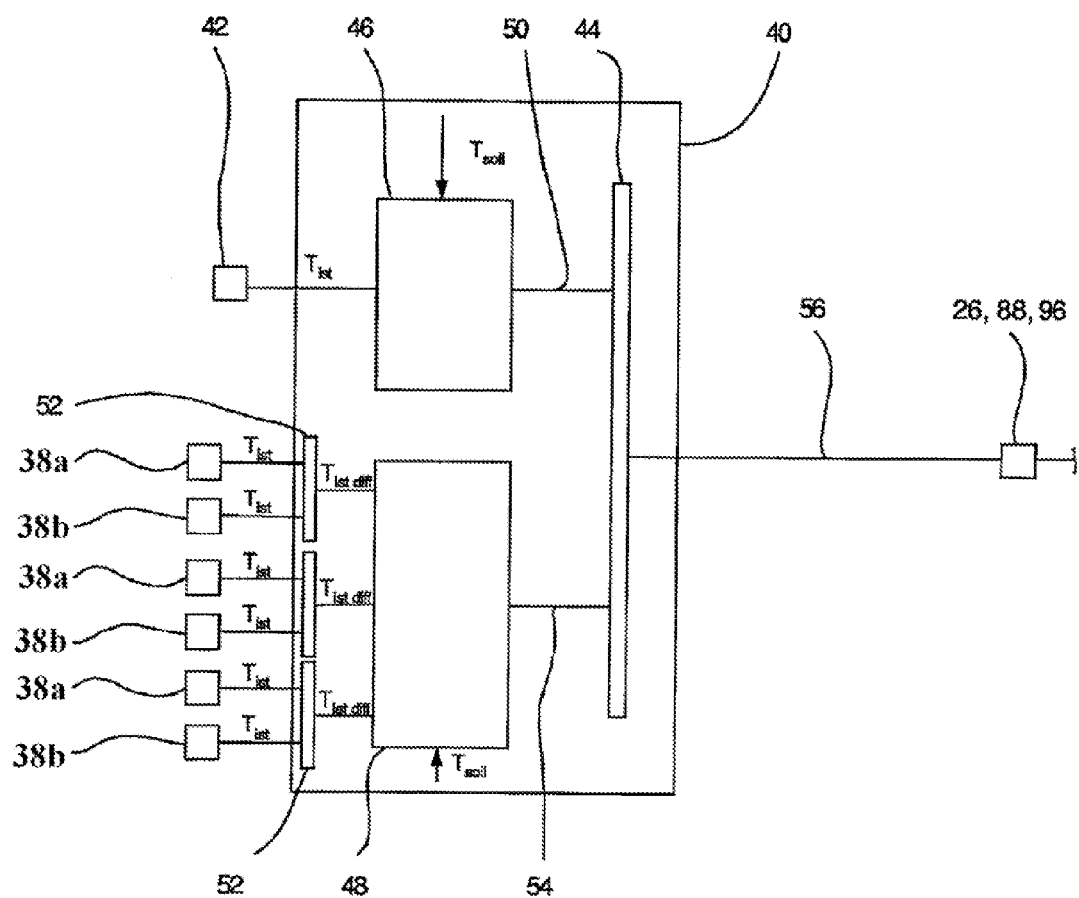
FIG. 2 shows a schematic sequence of the hydraulic balancing control in connection with a conventional temperature control according to the invention.

FIG. 2 shows the schematic sequence of the hydraulic balancing control in cooperation with the temperature control, with FIG. 2 showing only the control of one room 8 and a circuit 74-78, described further below, in order to provide a better overview.

The temperature control is obtained conventionally: the sensor in the form of a temperature sensor 42 cooperates with the temperature regulator 46. The actual temperature $T_{ist}$ in the room 8 is delivered to the temperature regulator 46 by the temperature sensor 42. The desired nominal temperature $T_{soll}$ for the room 8 is adjusted beforehand and stored in the control unit 40. This nominal temperature $T_{soll}$ is made available to the temperature regulator 46 by a memory of the control unit 40. A nominal value/actual value comparison results in an assigned control signal 50 for the servomotor 26 of the valves 28. For example, if the nominal temperature $T_{soll}$ is higher than the actual temperature $T_{ist}$ during a heating process, the valve 28 needs to be opened such that the volumetric flow of the heat transfer medium and therefore the heat emission of the radiator 22 into the room 8 are increased.

In addition to the temperature regulator 46, another regulator 48 is also provided for hydraulic balancing on the floors 8a-8c and in the circuit 74-78 described further below, as well as between the floors 8a and 8c. In this case, each temperature sensor of a flow conduit 38a and a return conduit 38b is assigned to a device 52 that determines the temperature difference between the heat transfer medium upstream and downstream of the radiator 22 or upstream and downstream of the consuming device based on the temperatures delivered by the temperature sensors 38. This temperature difference corresponds to an actual differential temperature $T_{ist\ diff}$.

The nominal differential temperature $T_{soll\ diff}$ results from a characteristic that refers to a preadjusted temperature difference between the flow conduit and the return conduit of the radiator 22 or of consumers as a function of the opening position of the valve 28 and the flow conduit temperature. The nominal value $T_{soll\ diff}$ is subject to a certain tolerance. The tolerance decreases proportionally with an increase in the number of active consumers and therefore the number of radiators 22 in operation, and increases proportionally with a decrease in the number of active consuming devices and therefore the number of radiators 22 in operation. The hydraulic balancing control signal of the regulator 48 is identified by the reference symbol 54.

If the differential temperature value $T_{ist\ diff}$ lies within the tolerance value $T_{soll\ diff}$, the control signal 54 corresponds to a value at which the flow cross section of the valve 28 is 100% open. If the differential temperature value $T_{ist\ diff}$ lies outside the tolerance value $T_{soll\ diff}$, the control signal 54 corresponds to a value that ensures hydraulic balancing, i.e., a value that must be smaller than the value of the control signal 50 of the temperature regulator 46.

The value of the control signal 54 of the regulator 48 for achieving hydraulic balancing therefore either corresponds to 100% of the opening cross section of the valve 28 or is smaller than the value of the control signal 50 of the temperature regulator.

The control signals 50 and 54 are then fed to a minimum selector 44 such that only the lower value 56 of a control signal 50 or 54 is fed to the servomotor 26 of the valve 28.

The control unit 40 ensures that hydraulic balancing is adjusted in increments such that overshooting is prevented and the system is able to enter the transient state.

Figure 3:
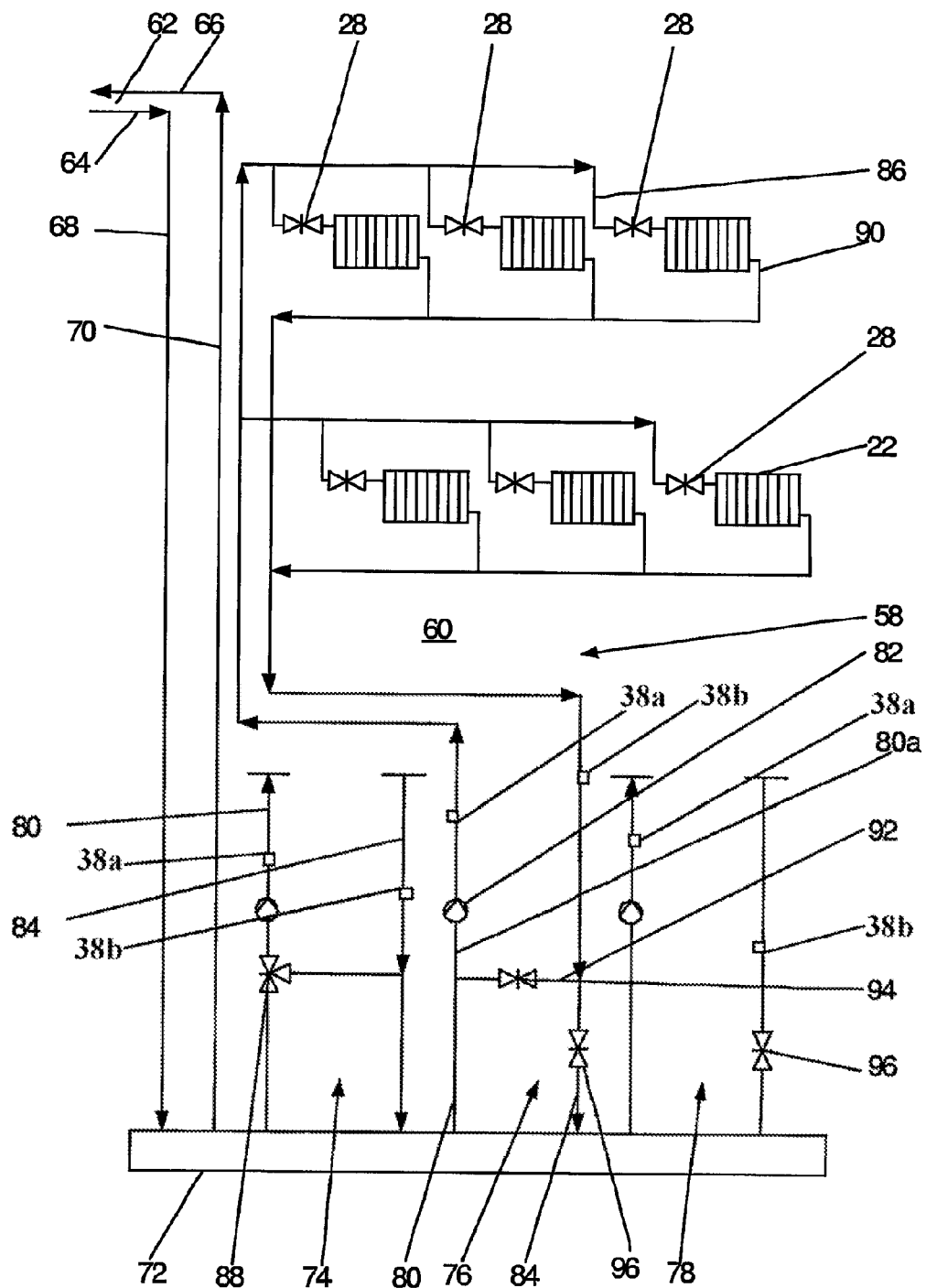
FIG. 3 shows another embodiment of the invention, in which the respective valve also serves as a section gate.

FIG. 3 schematically shows another embodiment of the invention. In this case, a valve 96 acts as a section gate and is controlled in accordance with the valve 28 thus far described by means of a servomotor, not shown, in order to achieve hydraulic balancing, wherein the valve in the circuit 74 is identified by the reference symbol 88 and is provided in the form of a three-way valve.

FIG. 3 shows a supply unit 58 that forms part of a central cooling and heating system 60. Only one supply unit 58 is shown for reasons of simplicity. However, the cooling and heating system 60 is composed of several supply units 58 that are designed in accordance with the supply unit 58 shown, and each supplies one building.

The main supply line 62 features a main flow conduit 64 and a main return conduit 66. A distribution unit 72 is connected to the main supply line 62 by means of the supply conduit 68 and the return conduit 70. The distribution unit 72 forms part of the supply unit 58.

The supply unit 58 furthermore comprises, for example, three circuits 74, 76 and 78, namely a ventilation circuit 74, a heating circuit 76 and a domestic water circuit 78. Each of the three circuits 74, 76 and 78 features a flow conduit 80, a pump 82 and a return conduit 84. The circuits 74, 76 and 78 each form different hydraulic circuits. However, the circuits 74, 76 and 78 are generally known, so that a more detailed description seems unnecessary. Only the heating circuit 76 is described in an exemplary fashion below.

In the detailed illustration of the heating circuit 76, the heating circuit is provided in the form of an injection circuit and provided with several radiators 22. A valve 28 is assigned to each radiator 22 in the supply conduit 86. The supply conduit 86 of the radiator 22 is connected to the flow conduit 80 of the heating circuit 76, and the return conduit 90 is connected to the return conduit 84 of said heating circuit.

The flow conduit 80 and the return conduit 84 of the heating circuit 76 are connected to one another by a bypass 92, into which a mechanical slide valve 94 is integrated. The position of the slide valve is not pre-adjusted, i.e., the valve is completely open and not adjusted.

Another valve 96 for regulating the volumetric flow and therefore the flow temperature is arranged in the return conduit 84 of the heating circuit 76 downstream of the bypass 92. Hydraulic balancing in accordance with the above-described embodiment is achieved between the individual circuits 74-78 by regulating/controlling the valve 96. Temperature sensors 38 that cooperate with a control unit 40 realized analogously to the control unit described above are arranged in the flow conduit 80 and in the return conduit 84 for this purpose.

The other valves 28 may—but do not necessarily have to—also be provided with sensors in the supply conduit 86 and return conduit 90 in order to achieve hydraulic balancing. It also suffices if hydraulic balancing is achieved between the circuits 74, 76 and 78.

LIST OF REFERENCE SYMBOLS

2 Building
4 Utility room

6 Heat source
8 Room
8a-8c Floors
10 Central heating system
12a-12c Partial sections
14 Riser flow conduit
16 Riser return conduit
18 Flow conduit of a partial section
20 Return conduit of a partial section
22 Radiator
24 Supply conduit of a heating section
26 Servomotor
28 Valve
30 Return conduit of a heating section
32 First heating section
34 Second heating section
36 Third heating section
38a, 38b Temperature sensors
40 Control unit
42 Additional sensors
44 Minimum selector
46 Temperature regulator
48 Hydraulic balancing regulator
50 Control signal for servomotor of temperature regulator
52 Device for determining a temperature difference
54 Control signal for hydraulic balancing
56 Control signal for minimum selector
58 Supply unit
60 Central cooling and/or heating device
62 Main supply line
64 Main flow conduit
66 Main return conduit
68 Supply conduit
70 Return conduit
72 Distribution unit
74 Ventilation circuit
76 Heating circuit
78 Domestic water circuit
80 Circuit flow conduit
80a Partial section of circuit flow conduit
82 Pump
84 Valve in circuit return conduit
86 Supply conduit of radiator
88 Valve
90 Return conduit of radiator
92 Bypass
94 Slide valve
96 Valve

The invention claimed is:

1. A cooling and/or heating device (10, 60) comprising: one or more heating or cooling units (8a-8c),
a conduit network having flow conduits and return conduits (14, 16; 68, 70) leading to and from the units,
one or more circuits (12a-12c; 32-38; 74-78) located in the one or more units and connected to the flow conduits and return conduits (14, 16; 68, 70),
at least one valve (28) provided in each circuit for adjusting a volumetric flow through each circuit,
a heat transfer medium disposed in the conduit network,
at least one consuming device (22) disposed in each circuit (12a-12c; 32-38; 74-78),
a control unit (40) connected to the valves (28) located in each circuit for adjusting a passage opening of each valve (28) to achieve hydraulic balancing in the conduit network,
sensors (38a, 38b) provided in each circuit (12a-12c; 32-38; 74-78), at least a first sensor (38a) located in a supply conduit for each circuit and at least a second sensor (38b) located in a return conduit for each circuit, the sensors (38a, 38b) sending signals to the control unit and forming part of a control circuit of the control unit (40), the control unit adjusting the valves (28) of each circuit as a function of the signals transmitted from the sensors (38a, 38b) to the control unit, for providing hydraulic balancing between the individual circuits (12a-12c; 32-38; 74-78), and
wherein the valves (28) in each circuit (12a-12c; 32-38;74-78) form the only automatically adjustable flow restrictors of each circuit (12a-12c; 32-38;74-78), the flow restricted over a predetermined adjustment range of opening of each valve (28).

2. The cooling and/or heating device according to claim 1 wherein the sensors (38a, 38b) are selected from the group consisting of temperature sensors, pressure sensors and combinations thereof.

3. The cooling and/or heating device according to claim 1 further comprising one sensor (38) provided upstream and one sensor provided downstream of the at least one consuming device (22).

4. The cooling and/or heating device according to claim 1 wherein the control unit (40) adjusts the hydraulic balancing at predetermined time intervals and in predetermined increments with respect to an extent of adjustment of the opening of the valves (28).

5. The cooling and/or heating device according to claim 1 further comprising at least one section valve (88, 96) disposed in a supply conduit or in a return conduit operated in conjunction with the valves (28).

6. The cooling and/or heating device according to claim 5 wherein each valve (28) and each section valve (88, 96) is connected to a servomotor (26) that receives control signals (56) from the control unit (40), the servomotor moving an actuator of each valve (28) and each section valve (88, 96) to a position defined by the control signals (56).

7. The cooling and/or heating device according to claim 1 wherein each valve (28) is connected to a servomotor (26) that receives control signals (56) from the control unit (40), the servomotor moving an actuator of each valve (28) to a position defined by the control signals (56).

8. The cooling and/or heating device according to claim 1 wherein each valve (28) does not restrict flow when the passage therein is completely open.

9. The cooling and/or heating device according to claim 1 wherein the control unit (40) has a first control circuit (42, 46) for regulating temperature and a second control circuit (38, 48, 52) for regulating the hydraulic balancing of the circuits.

10. The cooling and/or heating device according to claim 9 further comprising a minimum selector (44) connected to outputs of the first and second control circuits (42, 46; 38, 48, 52), the control signals (50, 54) for the valve (28, 88, 96) or the valves (28, 88, 96) resulting from both control circuits (42, 46; 38, 48, 52) being fed to the control unit (40) via the minimum selector (44), the valve or valves (28, 88, 96) assuming the minimal setting if different control signals are received.

* * * * *